United States Patent [19]

Lamberti et al.

[11] 4,101,632

[45] Jul. 18, 1978

[54] WASTE GAS INCINERATION CONTROL

[75] Inventors: Thomas G. Lamberti; Harry B. Rowe, both of Palestine, Tex.

[73] Assignee: Aluminum Company of America, Pittsburgh, Pa.

[21] Appl. No.: 736,480

[22] Filed: Oct. 28, 1976

[51] Int. Cl.$^2$ .............................................. B01D 53/34
[52] U.S. Cl. ................................... 423/210; 423/246; 23/277 C; 431/5; 110/345
[58] Field of Search ........... 423/210, 246, 247, 415 A; 110/8 A; 23/232 R, 277 C, 255 R; 235/151.12; 60/276, 289; 431/5, 12, 10

[56] References Cited

U.S. PATENT DOCUMENTS

| | | | |
|---|---|---|---|
| 3,026,184 | 3/1962 | Karasek | 23/255 R |
| 3,224,842 | 12/1965 | Manske | 423/212 X |
| 3,871,831 | 3/1975 | Andral et al. | 23/255 R |
| 4,009,240 | 2/1977 | Koenig | 423/210 |

*Primary Examiner*—Earl C. Thomas
*Attorney, Agent, or Firm*—William J. O'Rourke, Jr.

[57] ABSTRACT

A process is provided for substantially completely converting carbon monoxide in waste gas into carbon dioxide in a combustion chamber. This process comprises the steps of supplying fuel to the combustion chamber in an amount sufficient to maintain a temperature greater than the combustion temperture of carbon monoxide therein, feeding waste gas containing carbon monoxide to the combustion chamber, measuring the percentage of carbon monoxide in the waste gas, feeding free oxygen to the combustion chamber, exhausting the gas from the chamber, measuring the actual percentage of free oxygen in the exhaust gas, calculating an optimum percentage of free oxygen in the exhaust gas, and adjusting the volume of free oxygen being fed to the combustion chamber in an amount sufficient to produce the optimum percentage of free oxygen in the exhaust gas.

5 Claims, 2 Drawing Figures

WASTE GAS INCINERATION CONTROL

BACKGROUND OF THE INVENTION

1. Field of Invention

The present invention relates to a process for abating pollution, and more particularly, to an efficient process for substantially completely burning combustibles such as carbon monoxide in waste gas to meet or exceed the air pollution control regulations pertaining to allowable contaminants in gases exhausted to the atmosphere.

2. Description of the Prior Art

Most waste gases that evolve from processes involving the combustion of carbonaceous fuels include certain variable amounts of carbon monoxide. For example, the waste gas evolving from the production of aluminum chloride by chlorination of porous alumina intermixed with carbon, as disclosed in Russell et al. U.S. Pat. No. 3,842,163, includes approximately 50-75% nitrogen, 20-40% carbon dioxide, 0-35% carbon monoxide, with the balance being water vapor. Those skilled in the art will realize that the water vapor is actually picked up as evaporation of recycle water utilized in the gas scrubbers. For our purposes, the waste gas system is considered to be included in the production of aluminum chloride ($Al_2Cl_6$). Current air pollution regulations limit the amount of carbon monoxide that can be emitted to the atmosphere in exhaust gas. Such exhaust gases must usually be approximately 99.5% carbon monoxide free to meet or exceed the regulations.

In order to meet such regulations the waste gas may be incinerated in a combustion chamber maintained at a temperature above the combustion temperature of carbon monoxide (approximately 1157° F [625° C]) and supplied with sufficient excess secondary air to insure that the carbon monoxide is converted into carbon dioxide. The prior art, such as Lewis et al. U.S. Pat. No. 3,049,300, discloses the desirability of providing an optimum amount of excess air to avoid unnecessary heat loss and unburned fuel loss in combustion processes operated with a multiplicity of fuels for the purpose of evolving heat. It is important to maintain the combustion chamber temperature in a range of approximately 1200° F (650° C) to 2000° F (1100° C). If the temperature falls below 1157° F the carbon monoxide cannot burn, and if the temperature substantially exceeds 1157° F the heat tends to adversely affects the life of the refractory lining in the chamber.

The present invention is directed to a process for the conversion of carbon monoxide in waste gas into carbon dioxide when both the volume of waste gas and the percentage concentration of carbon monoxide are continuously fluctuating. Such fluctuations in volume and in percent carbon monoxide concentration make control of the process difficult. To insure that the exhaust gas from the combustion chamber continuously meets the air pollution regulations, the prior art suggests that combustion of the gas should be based on assumed worst case conditions. Worst case conditions are those in which the quantity of carbon monoxide in the waste gas is at a maximum expected under normal operation conditions.

Once a determination has been made as to the maximum practicable amount of carbon monoxide that can be expected to be fed into the combustion chamber under worst case conditions, sufficient secondary air can be supplied to the combustion chamber. The secondary air is required for complete combustion of the maximum quantity of carbon monoxide to insure continuous complete combustion. Sufficient fuel can also be supplied to the combustion chamber to maintain a relatively constant temperature in the combustion chamber to insure stable and complete combustion of the carbon monoxide.

Conversion of carbon monoxide to carbon dioxide based on an assumed worst case condition is inefficient. Secondary air is supplied to the combustion chamber in an amount necessary to convert the maximum practicable quantity of carbon monoxide into carbon dioxide. For the substantial majority of the time, less than the maximum quantity of carbon monoxide is in the waste gas. Therefore, for the substantial majority of the time an overabundance of secondary air is being supplied to the combustion chamber. Excess air has the effect of cooling the combustion chamber. When the chamber is unnecessarily cooled, more fuel must be supplied to the chamber to maintain the necessary combustion temperature. This results in a significant waste of fuels, such as natural gas, coal, coke, blast furnace gas, mixed gas, etc.

The way to eliminate the waste of combustion fuel is to operate the combustion chamber under actual case conditions rather than worst case conditions. The problem with operating under actual case conditions has been that the expense involved in installing, operating and maintaining the sensors, meters and other devices for continuously measuring the fluctuating quantity of carbon monoxide in the fluctuating volume of waste gas far outweights the potential fuel savings.

Accordingly, an economical and effective process is desired for efficiently converting carbon monoxide in waste gas into carbon dioxide in a combustion chamber.

SUMMARY OF THE INVENTION

This invention may be summarized as providing a process for the treatment of combustibles such as carbon monoxide in waste gas. In the method selected for the purpose of describing the present invention, this process comprises the steps of supplying fuel to the combustion chamber in an amount sufficient to maintain a temperature of approximately 1600° F (870° C) therein, feeding waste gas containing carbon monoxide to the combustion chamber, measuring the percentage of carbon monoxide in the waste gas, feeding free oxygen to the combustion chamber, exhausting the gas from the chamber, measuring the actual percentage of free oxygen in the exhaust gas, calculating the optimum percentage of free oxygen in the exhaust gas, and adjusting the volume of free oxygen being fed to the combustion chamber in an amount sufficient to produce the optimum percentage of free oxygen in the exhaust gas.

Among the advantages of the subject invention is the provision of an efficient process for incinerating combustibles such as carbon monoxide in waste gas, which results in a significant conservation of fuel.

An objective of this invention is to provide a process for the treatment of combustibles in waste gas in such a way that only the allowable concentration of combustibles remain in the gas when it is exhausted to the atmosphere.

It follows that an objective of this invention is to provide an inexpensive process for operating a combustion chamber for incinerating waste gas according to the actual quantity of carbon monoxide in the waste gas rather than operating according to the highest possible quantity of carbon monoxide in the waste gas.

Another objective of this invention is to provide a process for insuring a greater conversion efficiency of carbon monoxide to carbon dioxide than that required by air pollution control regulations while utilizing a minimum amount of fuel.

Another advantage of this invention is to provide a pollution abatement system which effectively operates according to a combustion process in which 1.5 times the amount of free oxygen required for stoichiometric combustion of the actual quantity of carbon monoxide present is continuously monitored and maintained.

Another advantage of the subject invention is the reduction in the amount of excess secondary air that is supplied to a combustion chamber for incinerating waste gases.

It follows that an advantage of reducing the amount of excess secondary air supplied to a combustion chamber and maintaining a constant temperature in the chamber will further minimize the amount of pollutant nitrous oxides that are formed in the incineration process.

The above and other objectives and advantages of this invention will be more fully understood and appreciated with reference to the following detailed description and the drawings appended hereto.

DESCRIPTION OF THE PREFERRED EMBODIMENTS

Figure 1:
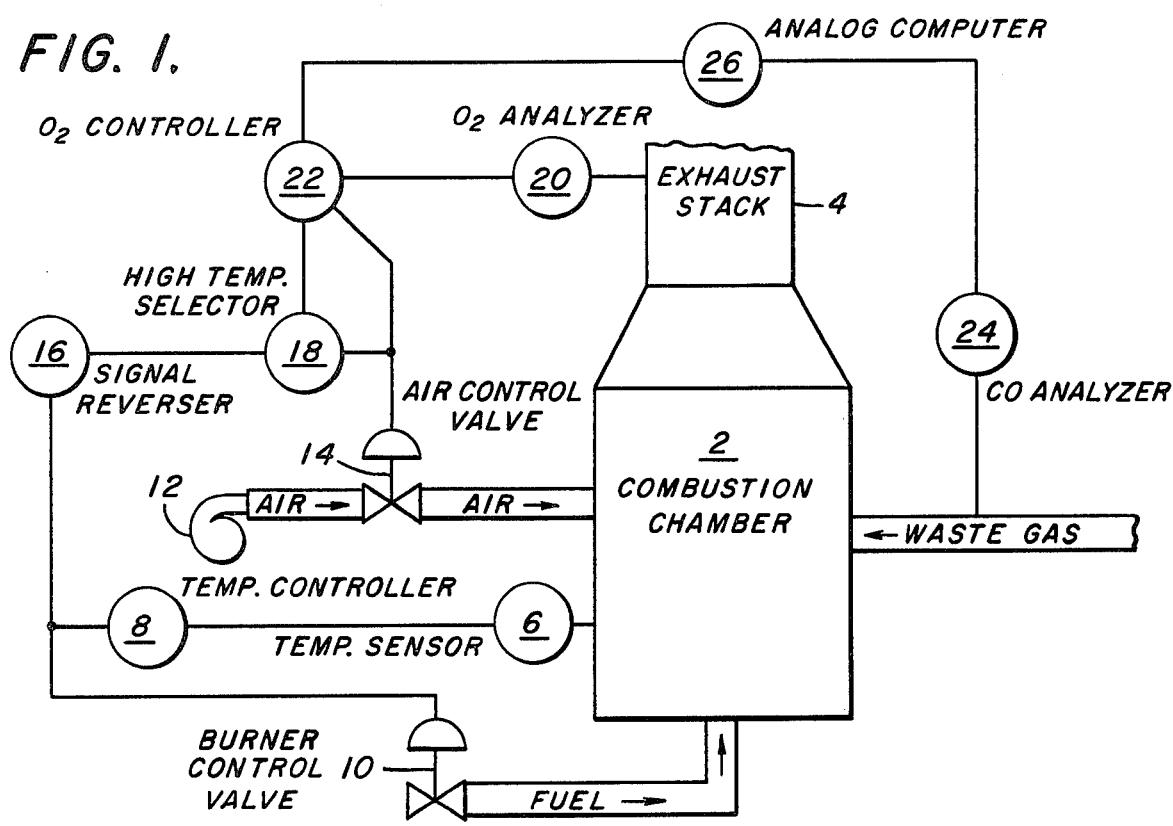
FIG. 1 is a schematic illustration of the waste gas incineration control technique of the present invention.

Referring particularly to the drawings, FIG. 1 illustrates a schematic diagram of the waste gas incineration control technique of the present invention. Incineration of the waste gas takes place in a combustion chamber 2 in order to convert carbon monoxide in the waste gas into carbon dioxide before the gas is exhausted to the atmosphere through an exhaust stack 4.

Incineration of such waste gas requires that the combustion chamber 2 be maintained at a relatively constant temperature above 1157° F, which is the combustion temperature of carbon monoxide, or the minimum temperature required to convert carbon monoxide into carbon dioxide. In order to insure that substantially all the carbon monoxide is converted into carbon dioxide a higher temperature, such as 1600° F (870° C), should be maintained. It is desirable that the temperature in the combustion chamber not substantially exceed 1600° F because higher temperatures adversely effect the life of the refractory lining provided in the combustion chamber and results in an increase in the amount of nitrous oxides ($NO_x$) produced. It will be understood by those skilled in the art that the high temperature limitation will necessarily depend on the quality, especially thermal resistance, of the refractory lining.

To maintain a temperature of approximately 1600° F, a sensor 6, such as a thermocouple in the refractory lining of the combustion chamber, should be provided to continuously monitor the temperature in the chamber 2. A temperature controller 8, responsive to the temperature sensor 6, should also be provided to increase the heat input when the chamber temperature falls below the 1600° F setpoint, and to decrease the heat input when the chamber temperature rises above setpoint.

Heat input may be decreased by setting the burners on minimum fire. However, high carbon monoxide concentrations in the waste gas could liberate sufficient excess heat in the combustion zone to cause the chamber temperature to exceed 1600° F even with the burners on minimum fire. To care for such excess heat, a signal reverser 16 and high temperature selector 18 may be provided to override the secondary air control valve 14 to admit sufficient air to cool the combustion chamber 2 near the 1600° F setpoint temperature.

Heat input may be increased by controlling the amount of fuel admitted to the combustion chamber 2 through a burner control valve 10. The preferred fuel for the incineration of waste gas is natural gas (methane $CH_4$), but those skilled in the art will understand that any fuel could be utilized in the process of this invention including coal, coke, fuel oil, mixed gas and blast furnace gas.

Secondary air must also be fed into the combustion chamber 2 to promote incineration of the waste gas. This air may be supplied through a fan 12 operated by an air control valve 14. It has been found that to insure substantially complete combustion of the carbon monoxide, air must be supplied to the chamber 2 in an amount providing 50% more free oxygen ($O_2$) than that theoretically required to combust the carbon monoxide.

An oxygen analyzer 20 is provided to continuously analyze slip streams of gas, representative of total gas from the exhaust stack 4, thus measuring the actual percentage of oxygen concentration in the exhaust gas. The analyzer 20 measures the amount of oxygen remaining after the carbon monoxide has substantially completely burned to carbon dioxide. Ideally, this measurement will reflect the 50% excess oxygen supplied to the combustion chamber.

The oxygen analyzer 20 is in communication with an oxygen controller 22 and the oxygen controller 22 is in communication with the air control valve 14. The oxygen controller 22 may be set on a position reflecting the optimum percentage of free oxygen in the exhaust gas. The optimum percentage of free oxygen in the exhasut gas is that concentration which at a given time reflects efficient conversion of carbon monoxide to carbon dioxide. If the oxygen analyzer 20 measurement of the actual percentage concentration of oxygen in the exhaust gas is lower than the oxygen controller 22 setpoint reflecting the optimum concentration of oxygen in the exhaust gas, the controller 22 will signal the air control valve 14 to open and admit sufficient secondary air to the combustion chamber 2, and vice versa. Thus, the amount of secondary air is constantly varied in order for the actual concentration of oxygen in the exhaust gas to approximate the optimum concentration of oxygen in the exhaust gas.

In the control technique of the present invention, the position of the oxygen controller 22 is a function of the percentage concentration of carbon monoxide in the waste gas. Therefore, a carbon monoxide analyzer 24 is provided to continuously measure the percentage of carbon monoxide concentration in a slip stream, representative of the total waste gas.

The optimum percentage concentration of oxygen in the exhaust gas to insure that 50% more free oxygen is provided over that theoretically required to combust the carbon monoxide may be calculated from the specific quantity or amount of carbon monoxide in the waste gas. However, this optimum percentage of oxygen in the exhaust gas has been found to be a function of the percentage concentration rather than requiring a specific quantity of carbon monoxide in the waste gas. Unexpectedly, this relationship is virtually unaffected either by changes in volume of waste gas flow or by changes in carbon monoxide concentration. As will be explained in detail below, the optimum percentage of free oxygen in the exhaust gas is equal to 0.5 + (0.14 × %CO in waste gas.)

The percentage concentration of carbon monoxide in the waste gas, as measured by the carbon monoxide analyzer 24, is transmitted to an analog computer 26, or the like, wherein the optimum percentage of free oxygen in the exhaust gas is calculated, from the above formula, and is transmitted to the oxygen controller 22 as a variable control. The oxygen controller 22 continuously adjusts the volume of free oxygen in the air being fed to the combustion chamber 2 in an amount sufficient for the actual percentage of free oxygen in the exhaust gas to approximate the calculated optimum percentage of free oxygen in the exhaust gas. Such control technique minimizes the excess air which otherwise unnecessarily cools the combustion chamber 2, and thereby conserves the fuel required to compensate for the unnecessary cooling effect of excess air.

The following examples which are based on typical operating conditions for a waste gas incinerator illustrate the method of the present invention and exemplary fuel savings that can result therefrom:

EXAMPLE 1

Waste gas evolving from a process for producing aluminum chloride by chlorination of coked alumina is fed into a combustion chamber. The waste gas constituents are as follows:

Table I

| Gas | SCFM | % Concentration |
|---|---|---|
| Nitrogen ($N_2$) | 223 | 52 |
| Carbon Dioxide ($CO_2$) | 149 | 35 |
| Carbon Monoxide (CO) | 31 | 7 |
| Water Vapor ($H_2O$) | 26 | 6 |
| Total Waste Gas | 429 | 100 |

Theoretically, using the equation $2CO + O_2 \rightarrow 2CO_2$, free oxygen is required in an amount equal to half the quantity of carbon monoxide. Therefore, 15.5 SCFM of free oxgyen is theoretically required to burn 31 SCFM of carbon monoxide. However, to insure complete combustion of the carbon monoxide, free oxygen is supplied in an amount 50% greater than that theoretically required. In this case, 15.5 SCFM + (50%) (15.5 SCFM) = 23 SCFM of free oxygen. To supply 23 SCFM of free oxygen to the combustion chamber 115 SCFM of air having the following constituency must be supplied to the chamber.

Table II

| Gas | SCFM |
|---|---|
| Nitrogen ($N_2$) | 88 |
| Oxygen ($O_2$) | 23 |
| Water Vapor ($H_2O$) | 4 |
| Total Air | 115 |

At this point, by adding the values of Table I to those of Table II, the waste gas and the air in the chamber prior to combustion have the following constituency:

Table III

| Gas | SCFM |
|---|---|
| Nitrogen ($N_2$) | 311 |
| Carbon Dioxide ($CO_2$) | 149 |
| Carbon Monoxide (CO) | 31 |
| Oxygen ($O_2$) | 23 |
| Water Vapor ($H_2O$) | 30 |
| Total Chamber Gas | 544 |

Based on known BTU's per cubic foot values, the total heat required to heat these gases to 1600° F is approximately 19,000 BTU per minute. The total heat released from the ignition of the carbon monoxide is 321.8 $BTU/ft^3$ × 31 SCFM = 10,100 BTU per minute. By substraction these values the net heat input required for heating the gases to 1600° F is approximately 8,900 BTU per minute. Natural gas (methane $CH_4$) provides approximately 545.98 BTU per SCF at this temperature, therefore 16 SCFM of natural gas would be required to provide the net heat input of 8,900 BTU per minute; (8,900 BTU/min ÷ 545.98 BTU/SCF = 16 SCFM).

In the process of heating the amounts of gases listed in Table III, the carbon monoxide ignites or combines with the oxygen to form carbon dioxide. There are also products of combustion of the natural gas which change the constituents of the resulting exhaust gas as shown below:

Table IV

| | SCFM | | | |
|---|---|---|---|---|
| Gas | Precombustion Chamber Gas Table III | Postcombustion Chamber Gas | Methane Products of Combustion | Exhaust Gas |
| Nitrogen ($N_2$) | 311 | 311 | 131 | 442 |
| Carbon Dioxide ($CO_2$) | 149 | 180 | 16 | 196 |
| Carbon Monoxide (CO) | 31 | — | — | — |
| Oxygen ($O_2$) | 23 | 8 | 2 | 10 |
| Water Vapor ($H_2O$) | 30 | 30 | 38 | 68 |
| Total | 544 | 529 | 187 | 716 |

The percentage of free oxygen $O_2$ in the exhaust gas required to insure that the carbon monoxide is converted into carbon dioxide can be calculated by the above procedure to be equal to 10 SCFM oxygen divided by 716 SCFM total exhaust gas, or about 1.4%. The drawback of this calculation is that definitive or quantitative numerical gas volume values were thought to be required to accurately calculate the amount of secondary air and natural gas required for the incineration process. If the percentage concentration of CO in the waste gas remained relatively constant, and if the waste gas flow rate remained relatively constant, the above calculation results would be about the same at all times and there would be no control problem. However, such is not the case. In the actual waste gas incineration process the gas volume and the carbon monoxide concentration constantly fluctuate. The cost to install and maintain the meters, gauges and sensors necessary to continuously compute the specific quantity of carbon monoxide and the specific quantity of waste gas would be excessive. Therefore, in the practical operation of the incineration process the oxygen analyzer 20 and controller 22 would theoretically be set for worst case conditions, i.e. the condition in which the excess oxygen in the exhaust gas is at its highest practicable value, which results in significant inefficiencies.

Using the procedure explained for Example 1, the following percentage concentrations of free oxygen in the exhaust gas were calculated for various typical operating conditions:

Table V

| Ex. | Total Waste Gas SCFM | CO in Waste Gas SCFM | CO in Waste Gas % | SCFM Air Required | SCFM Natural Gas Required | SCFM Exhaust Gas | O$_2$ in Exhaust Gas SCFM | O$_2$ in Exhaust Gas % |
|---|---|---|---|---|---|---|---|---|
| 1 | 429 | 31 | 7.3 | 115 | 16 | 716 | 10 | 1.4 |
| 2 | 729 | 31 | 4.3 | 115 | 32 | 1202 | 12 | 1.0 |
| 3 | 2779 | 0 | 0 | 0 | 152 | 4524 | 20 | 0.4 |
| 4 | 2291 | 0 | 0 | 0 | 125 | 3986 | 16 | 0.4 |
| 5 | 1967 | 31 | 1.6 | 115 | 100 | 3219 | 21 | 0.7 |
| 6 | 2657 | 78 | 2.9 | 288 | 140 | 4511 | 38 | 0.8 |
| 7 | 2814 | 382 | 13.6 | 1408 | 30 | 4374 | 99 | 2.3 |
| 8 | 2203 | 156 | 7.1 | 575 | 100 | 3839 | 52 | 1.4 |
| 9 | 2215 | 156 | 7.0 | 575 | 110 | 3974 | 53 | 1.3 |

Since Table V is representative of the various operation conditions for waste gas incineration process, then Example 7 is the worst case condition. If the "worst case" incineration control technique was employed, the oxygen analyzer 20 and controller 22 would be set such that 2.3% free oxygen, Example 7, would always be present in the exhaust gas. Such a control technique insures that substantially all of the carbon monoxide is incinerated at every operating condition. However, setting the O$_2$ analyzer at 2.3% in all cases results in supplying an overabundance of secondary air to the combustion chamber 2 in every other example shown in Table V. This excess air unnecessarily cools the combustion chamber 2 and thereby requires additional fuel to compensate for the heat loss. The following table illustrate the excess air and natural gas required if the oxygen analyzer 20 and controller 22 are set on a fixed point of 2.5% oxygen in each case. 2.5% Oxygen would be chosen instead of the calculated worst case percentage of 2.3% because of practicalities in the calibration and operation of commercially available oxygen analyzers and controllers.

Table VI

| Ex. | SCFM Secondary Air Required | SCFM Secondary Air Delivered | SCFM Secondary Air Excess | SCFM Natural Gas Required | SCFM Natural Gas Delivered | SCFM Natural Gas Excess |
|---|---|---|---|---|---|---|
| 1 | 115 | 160 | 45 | 16 | 19 | 3 |
| 2 | 115 | 216 | 101 | 32 | 38 | 6 |
| 3 | 0 | 523 | 523 | 152 | 181 | 29 |
| 4 | 0 | 468 | 468 | 125 | 151 | 26 |
| 5 | 115 | 449 | 334 | 100 | 119 | 19 |
| 6 | 288 | 709 | 421 | 140 | 164 | 24 |
| 7 | 1408 | 1464 | 56 | 30 | 33 | 3 |
| 8 | 575 | 822 | 247 | 100 | 114 | 14 |
| 9 | 575 | 833 | 258 | 110 | 124 | 14 |

Figure 2:
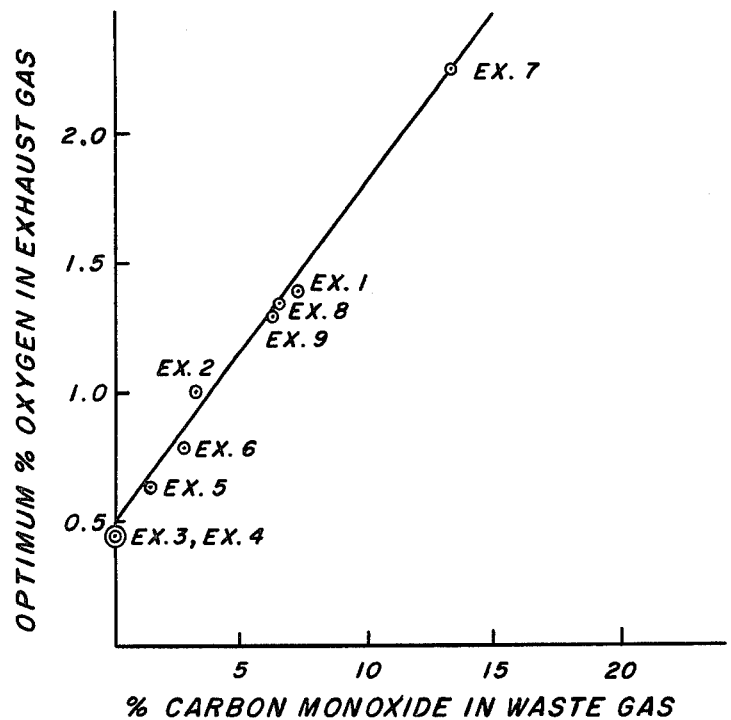
FIG. 2 is a graph plotting the minimum percentage of free oxygen concentration in the exhaust gas as a function of the actual percentage of carbon monoxide concentration in the waste gas.

In contrast with the "worst case" control technique, the present invention involves an economical and uncomplicated method of determining the variable percentage of oxygen in the exhaust gas as operating conditions fluctuate, without requiring a multitude of sensing equipment to continuously compute the actual quantities of waste gas or carbon monoxide. FIG. 2 is a graph plotting the relationship between the percent CO in waste gas and the percent O$_2$ in the exhaust gas, for the examples displayed in Table V. Unexpectedly, it was found that the optimum percentage concentration of oxygen in the exhaust gas is a function of the percentage concentration of carbon monoxide in the waste gas. Surprisingly, this relationship is virtually unaffected by fluctuations in volume of waste gas flow, or fluctuations in carbon monoxide concentration. This relationship is expressed by the following formula:

$$\%O_2 \text{ exhaust gas} = 0.5 + (0.14)(\% \text{ CO waste gas})$$

Using the above formula to continuously compute the optimum percentage of O$_2$ in the exhasut gas as a variable setpoint for the oxygen analyzer and controller avoids the need to feed excess amounts of air and natural gas into the combustion chamber, as occurs in the "worst case" incineration process shown in Table VI. This invention therefore results in savings, as shown below:

Table VII

| Ex. | "Worst Case" Process Excess Air (SCFM) | "Worst Case" Process Excess(SCFM) Natural Gas | Present Process Excess Air (SCFM) | Present Process Excess(SCFM) Natural Gas | Savings Per Minute (SCFM) Air | Savings Per Minute Excess(SCFM) Natural Gas | Natural Gas Savings Per Day |
|---|---|---|---|---|---|---|---|
| 1 | 45 | 3 | 5 | 0 | 40 | 3 | 4320 |
| 2 | 101 | 6 | 6 | 0 | 95 | 6 | 8640 |
| 3 | 523 | 29 | 13 | 1 | 510 | 28 | 40320 |
| 4 | 468 | 26 | 18 | 1 | 450 | 25 | 36000 |
| 5 | 334 | 19 | 8 | 0 | 326 | 19 | 27360 |
| 6 | 421 | 24 | 14 | 1 | 397 | 23 | 33120 |
| 7 | 56 | 3 | 31 | 2 | 25 | 1 | 1440 |
| 8 | 247 | 14 | 28 | 2 | 219 | 12 | 17280 |
| 9 | 258 | 14 | 29 | 2 | 229 | 12 | 17280 |

An additional benefit associated with the incineration control technique of the present invention is that by reducing the amount of secondary air supplied to the combustion chamber, and by maintaining a relatively constant chamber temperature of approximately 1600° F, the amount of Nitrogen (N$_2$) is necessarily reduced and the formation of nitrous oxide pollutants (NO$_x$) is also minimized.

Whereas the particular embodiments of this invention have been described above for purposes of illustration, it will be apparent to those skilled in the art that numerous variations of the details may be made without departing from the invention. For example, this invention can be employed for treating waste gas containing combustibles other than carbon monoxide, such as ethylene, acetylene, napthalene and organic chemicals, in such a way that only the allowable concentration of combustibles remain in the gas when it is exhausted to the atmosphere.

What is claimed is:

1. A process for controlling the amount of air to be mixed with waste gas containing combustibles being fed into a combustion chamber comprising:
   maintaining a chamber temperature greater than the combustion temperature of the combustible in the waste gas;
   introducing a continuously fluctuating volume of waste gas containing a continuously fluctuating percentage concentration of combustibles into the combustion chamber;
   measuring the percentage of combustibles in the waste gas;
   computing the optimum percentage of free oxygen in the gas exhausting the chamber based on the percentage of combustibles in the waste gas;
   measuring the actual percentage of free oxygen in the exhaust gas directly exhausted from the combustion chamber; and
   adjusting the volume of air flow into the chamber so as to produce the optimum percentage of free oxygen in the exhaust gas.

2. A process as set forth in claim 1 in which the combustible in the waste gas is carbon monoxide.

3. A process as set forth in claim 2 in which the optimum percentage of free oxygen in the exhaust gas is computed by the formula: $\%O_2$ in exhaust gas $= 0.5 + (0.14 \times \%CO$ in waste gas$)$.

4. A process for substantially completely converting a fluctuating concentration of carbon monoxide in a fluctuating volume of waste gas into carbon dioxide in a combustion chamber, comprising:
   supplying fuel to the combustion chamber in an amount sufficient to maintain a relatively constant temperature greater than approximately 1157° F therein;
   feeding waste gas containing carbon monoxide to said combustion chamber;
   measuring the percentage of carbon monoxie in said waste gas;
   feeding free oxygen to the combustion chamber;
   exhausting the gas directly from said combustion chamber;
   measuring the actual percentage of free oxygen in said exhaust gas directly exhausted from the combustion chamber;
   calculating an optimum percentage of free oxygen in said exhaust gas based on the formula: optimum percentage of free oxygen in exhaust gas $= 0.5 + (0.14 \times$ the percentage of carbon monoxide in the waste gas$)$; and
   adjusting the volume of free oxygen being fed to said combustion chamber in an amount sufficient for the actual percentage of free oxygen in said exhaust gas to approximate the optimum percentage of free oxygen in said exhaust gas.

5. A process for converting a fluctuating concentration of carbon monoxide in a fluctuating volume of waste gas into carbon dioxide in a combustion chamber, comprising:
   supplying fuel selected from the group consisting of natural gas, mixed gas, blast furnace gas, fuel oil and coal to the combustion chamber in an amount sufficient to maintain a temperature of approximately 1550° F to 1650° F therein;
   feeding waste gas containing carbon monoxide to said combustion chamber;
   substantially continuously measuring the percentage of carbon monoxide in said waste gas;
   feeding free oxygen to the combustion chamber;
   exhausting the gas directly from said combustion chamber;
   substantially continuously measuring the actual percentage of free oxygen in said exhaust gas directly exhausted from the combustion chamber;
   substantially continuously calculating an optimum percentage of free oxygen in said exhaust gas based on the formula: optimum percentage of free oxygen in exhaust gas $= 0.5 + (0.14 \times$ the percentage of carbon monoxide in the waste gas$)$; and
   adjusting the volume of free oxygen being fed to said combustion chamber in an amount sufficient for the actual percentage of free oxygen in said exhaust gas to approximate the optimum percentage of free oxygen in said exhaust gas.

* * * * *